United States Patent
Makuch et al.

(10) Patent No.: US 8,924,942 B1
(45) Date of Patent: Dec. 30, 2014

(54) IDENTIFYING USER INTERFACE IMPROVEMENTS FROM OBSERVED USER BEHAVIOR

(75) Inventors: Jason D. Makuch, Seattle, WA (US); Mitchell Kim, Irvine, CA (US); Zahur A. Peracha, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 13/363,802

(22) Filed: Feb. 1, 2012

(51) Int. Cl.
G06F 9/44 (2006.01)
G06F 3/00 (2006.01)

(52) U.S. Cl.
USPC ............ 717/131; 717/125; 717/126; 715/762

(58) Field of Classification Search
USPC ....................................................... 717/131
See application file for complete search history.

(56) References Cited

U.S. PATENT DOCUMENTS

| | | | |
|---|---|---|---|
| 6,807,583 B2 * | 10/2004 | Hrischuk et al. | 719/318 |
| 2003/0163365 A1 * | 8/2003 | Farnes et al. | 705/11 |
| 2003/0236775 A1 * | 12/2003 | Patterson | 707/3 |
| 2008/0301672 A1 * | 12/2008 | Rao et al. | 717/177 |
| 2009/0150814 A1 * | 6/2009 | Eyer et al. | 715/765 |

OTHER PUBLICATIONS

F. G. Dias, E. A. Schmitz, M. L. M. Campos, A. L. Correa, and A. J. Alencar. 2008. Elaboration of use case specifications: an approach based on use case fragments. In Proceedings of the 2008 ACM symposium on Applied computing (SAC '08). ACM, New York, NY, USA, 614-618. DOI=10.1145/1363686.1363835 http://doi.acm.org/10.1145/1363686.1363835.*

* cited by examiner

*Primary Examiner* — James D Rutten
(74) *Attorney, Agent, or Firm* — Thomas | Horstemeyer, LLP.

(57) ABSTRACT

Disclosed are various embodiments for identifying user interface improvements from observed user behavior. A use case description is obtained from a developer of an application. Usability metrics are collected that observe interaction of a plurality of users with a user interface of the application. The usability metrics are analyzed in conjunction with the use case description to identify at least one aspect of the user interface for improvement. The aspect includes a page or an actionable element. Information is provided to the developer about the at least one aspect of the user interface identified for improvement.

22 Claims, 5 Drawing Sheets

IDENTIFYING USER INTERFACE IMPROVEMENTS FROM OBSERVED USER BEHAVIOR

BACKGROUND

Developers may offer applications for purchase or download through an electronic application marketplace. Usability tests may reveal a user's dissatisfaction with the user interface of the application and/or inefficiencies in using the application to complete a task.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
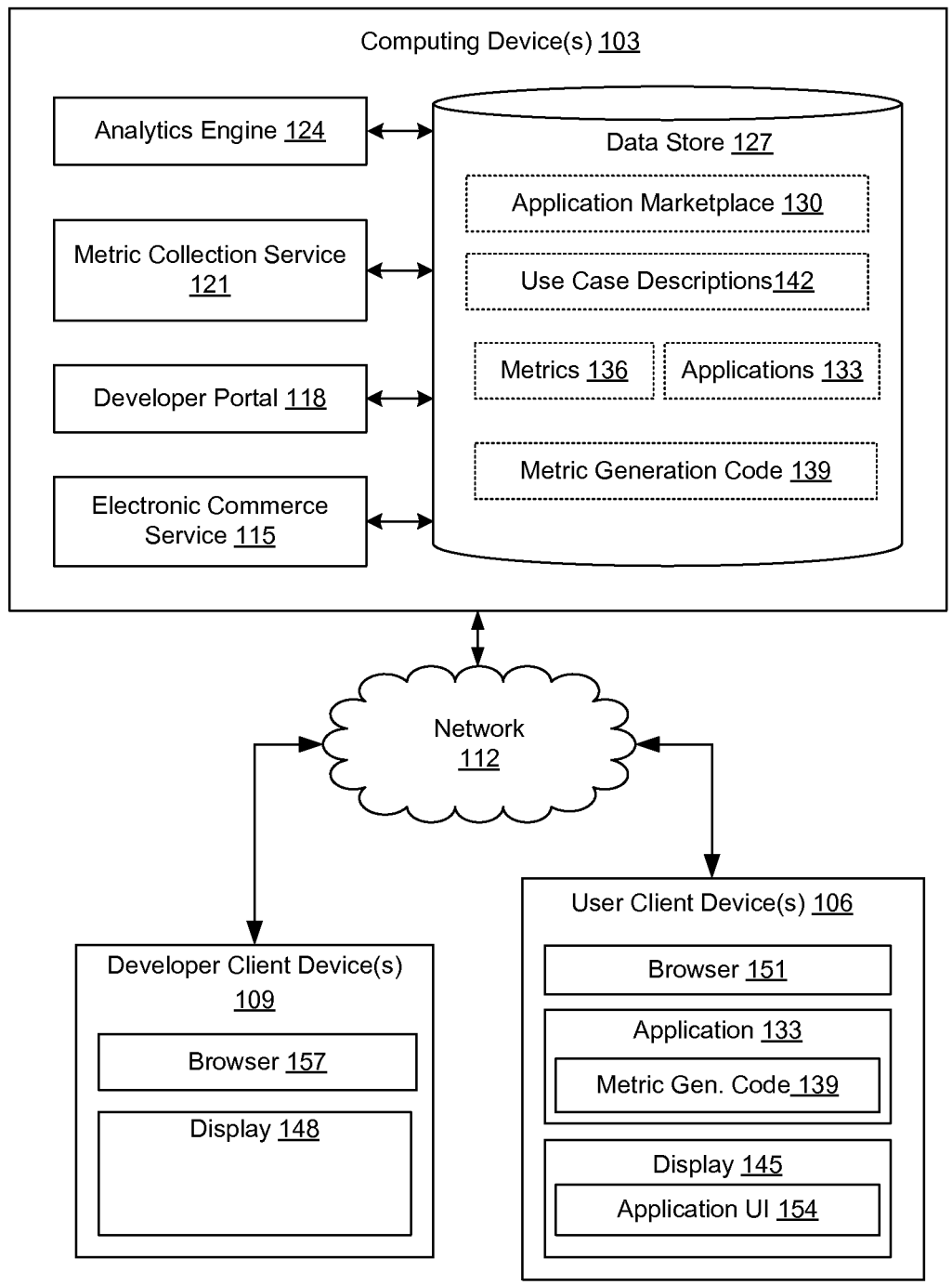
FIG. 1 is a drawing of a networked environment according to one embodiment of the present disclosure.

The various embodiments described herein relate to programmatically identifying improvements to the user interface of an application based on usability metrics collected from users interacting with the application and on use case descriptions provided by application developers. The use case description describes the desired behavior contemplated by the developer while the usability metrics show actual user behavior. An analytics engine examines the collected usability metric and determines whether user behavior corresponds to the developer's expectations. If the analytics engine finds a discrepancy between actual and expected behaviors, the analytics engine identifies a particular aspect of the user interface that is linked to the discrepancy in behavior, and designates the identified aspect as an area for improvement. The identified improvements are communicated to the application developer, and the developer can then use this information as feedback to modify the application.

In one example scenario, the application is an electronic commerce marketplace, and usability metrics are collected which show the navigation paths which various users take through the user interface in order to purchase an item in the electronic catalog. The developer provides a use case description which specifies purchase of any item as the goal and further specifies a navigation path (top-sellers list to item detail to purchase) to achieve the goal. Usability metrics such as navigation path and task completion time metrics are collected from multiple users running the application. These collected usability metrics show that while users are reaching the item detail page from the top-sellers list page, these users are then spending time in the review area of the detail page before clicking on the Buy button on the detail page. More specifically, in this example the metrics show that users are spending time locating and then reading negative reviews before buying. Under these conditions, the analytics engine may identify the review section of the item detail page as aspect of the user interface to be improved. The analytics engine may further recommend to the developer a change to the layout of the item detail page so that several negative reviews are presented at the top of the review pane, thus reducing the amount of time and effort needed to read a negative review from the detail page. The analytics engine may also recommend to the developer a change to the layout of the review page to include a Buy button, thus eliminating the need to return to the item detail page to make a purchase.

While the particular aspect identified in this particular example was placement of user interface components on a page, the disclosure applies to other user interface aspects as well. Such aspects include, but are not limited to, navigation paths through the user interface, additional pages or paths, presence of particular user interface components on a page, and presence of particular components in the application. In this manner, developers can be notified of various deficiencies in the user interface such as unused features, dead-end paths, and error-prone paths. In the following discussion, a general description of the system and its components is provided, followed by a discussion of the operation of the same.

With reference to FIG. 1, shown is a networked environment 100 according to various embodiments. The networked environment 100 includes one or more computing devices 103 in data communication with one or more devices 106 and with one or more client devices 109 by way of a network 112. The network 112 includes, for example, the Internet, intranets, extranets, wide area networks (WANs), local area networks (LANs), wired networks, wireless networks, or other suitable networks, or any combination of two or more such networks.

A computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

Various applications and/or other functionality may be executed in the computing device 103 according to various embodiments. The components executed on the computing device 103 include, for example, an electronic commerce service 115, a developer portal 118, a metric collection service 121, and an analytics engine 124. The components executed on the computing device 103 may also include other applications, services, processes, systems, engines, or functionality not discussed in detail herein. These components may communicate with each other using various mechanisms, including but not limited to any type of middleware framework. Although the electronic commerce service 115, the developer portal 118, the metric collection service 121, and the analytics engine 124 are shown as separate components in the example embodiment of FIG. 1, in other embodiments these components may be integrated, as should be appreciated.

Also, various data is stored in a data store 127 that is accessible to the computing device 103. The data store 127 may be representative of a plurality of data stores as can be appreciated. The data stored in the data store 127, for example, is associated with the operation of the various applications and/or functional entities of the computing device 103 as described herein. The data stored in the data store 127 includes, for example, an application marketplace 130, applications 133, usability metrics 136, metric generation code 139, and use case descriptions 142.

The electronic commerce service 115 is executed in order to facilitate the online purchase of applications 133 by customers from one or more application marketplaces 130 over the network 112. The electronic commerce service 115 also performs various backend functions associated with the online presence of an application marketplace 130 in order to facilitate the online purchase of applications 133 as will be described. For example, the electronic commerce service 115 may generate network pages such as, for example, web pages and/or other types of network content that are provided to devices 106 for the purposes of promoting and selecting applications 133 for purchase, rental, download, lease, or any other forms of consumption. To this end, the electronic commerce service 115 may include a commercially available hypertext transfer protocol (HTTP) server such as, for example, Apache® HTTP Server, Apache® Tomcat®, Microsoft® Internet Information Services (IIS), and so on.

An application marketplace 130 corresponds to a network site that offers a multitude of applications 133 for sale, download, purchase, lease, etc., by users. The applications 133 correspond to various applications that may be executed in the client device 106. The applications 133 are offered through the application marketplace 130 by multiple developers. In one embodiment, developers may self-register for accounts with the application marketplace 130 and self-manage various offerings of applications 133 in the application marketplace 130 by way of the developer portal 118.

The developer portal 118 is configured to obtain applications 133 from client devices 109 and to store the applications 133 in the data store 127 of the computing device 103, for access by the application marketplaces 130. The developer portal 118 may include a commercially available hypertext transfer protocol (HTTP) server such as, for example, Apache® HTTP Server, Apache® Tomcat®, Microsoft® Internet Information Services (IIS), and so on.

Before making an application 133 available through an application marketplace 130, the developer portal 118 is configured to instrument an application 133 with metric generation code 139. To this end, the developer portal 118 identifies locations in the application 133 where usability metrics 136 are to be collected, and modifies the application 133 to include code that generates and then reports the usability metrics 136 to the metric collection service 121. The metric collection service 121 is configured to collect and store these usability metrics 136.

As should be appreciated, a usability metric 136 measures some aspect of a user's interaction with the user interface of an application 133. The analytics engine 124 is configured to process the usability metrics 136, and potentially other data, to generate information for the developer regarding possible improvements to the user interface of the application 133. This analysis process will be described in further detail below. The developer portal 118 may be configured to present these possible improvements to the developer. Such information may be presented to the developer via network pages, email messages, mobile applications, text messages, and/or other reporting media.

Having discussed the computing device 103, the client device 106 and the client device 109 will now be considered. The client device 106 and the client device 109 are each representative of a plurality of client devices that may be coupled to the network 112. The client device 106 and the client device 109 may comprise, for example, a processor-based system such as a computer system. Such a computer system may be embodied in the form of a desktop computer, a laptop computer, a personal digital assistant, a cellular telephone, a smartphone, a set-top box, a television, a music player, a video player, a media player, a web pad, a tablet computer system, a game console, an electronic book reader, or other devices with like capability. The client device 106 may include a display 145 while the client device 109 may include a display 148. The display 145, 148 may comprise, for example, one or more devices such as cathode ray tubes (CRTs), liquid crystal display (LCD) screens, gas plasma-based flat panel displays, LCD projectors, or other types of display devices, etc.

The client device 106 may be configured to execute various applications such as a browser 151. The browser 151 may be executed in the client device 106, for example, to access and render network pages, such as web pages, or other network content served up by the computing device 103 and/or other servers, thereby generating a rendered content page on a display of the client device 106. The client device 106 may also be configured to execute an application 133 obtained from the computing device 103, where the application 133 has been modified to include metric generation code 139 for generating and reporting usability metrics 136 to the metric collection service 121. The user interface 154 of the application 133 is rendered on the display 145. The client device 106 may be configured to execute applications beyond the browser 151 such as, for example, email applications, messaging applications, and/or other applications.

The client device 109 may be configured to execute various applications such as a browser 157. The developer may use the browser 157 to interact with the developer portal 118 executing in the computing device 103. The client device 106 may be configured to execute applications beyond the browser 157 such as an integrated development environment, developer tools, and/or other applications.

Next, a general description of the operation of the various components of the networked environment 100 is provided. To begin, a developer at a client device 109 creates an application 133. The application 133 may be designed for execution in a general-purpose computing device or in a specialized device such as, for example, a smartphone, a video game console, a handheld game device, an arcade game device, etc. A non-limiting list of application types includes games, photo manipulation applications, video editing applications, and office productivity applications.

The developer transfers the application 133 to the computing device 103 by way of the developer portal 118. In some embodiments, the developer specifies during the transfer process whether the application 133 is to be modified to collect usability metrics 136. For instance, some applications 133 may operate with private and/or confidential information that the developer may not want modified due to security concerns. In other embodiments, the application 133 may be modified regardless of any developer input. It is understood that the applications 133 may be stored at the computing device 103 as binary files, and the source code to the applications 133 may be unavailable to the computing device 103.

As part of the transfer process, the developer may also specify those locations in the application 133 where usability metrics 136 are to be generated. These locations may be specified, for example, by way of an application programming interface (API). Additionally, the developer may specify what data is to be included in a particular usability metric 136. A non-limiting list of types of usability metrics 136 include measures of the user's performance on a task carried out using the application 133, the user's engagement with various aspects of the application 133, the user's satisfaction with various aspects of the application 133, the user's preferences with regard to various aspects of the application 133, the user's recall of various aspects of the application 133, the user's recognition of various aspects of the application 133, and the user's physiological reactions while interacting with the application 133. A non-limiting list of example usability metrics 136 includes a task completion time, a task success rate, a task error rate, a task error recovery rate, and a navigation path. A usability metric 136 may include various data about the current interaction between the user and the application 133, such as the current page, the actionable element with which the user most recently interacted, the current execution time, and the current location in the application 133.

The developer also interacts with the developer portal 118 to provide one or more use case descriptions 142 for the application 133. As described herein, usability metrics 136 describe actual interactions of users with the application 133 in various scenarios. In contrast, a use case description 142 refers to a specific set of user interactions with application 133 contemplated by the developer. In other words, a use case description 142 describes a particular use case envisioned by the developer while usability metrics 136 describe what actually happened. In some embodiments, a use case description 142 includes a goal or task to be completed by the user. Discrepancies between what a developer expects to happen and what actually happened can indicate areas for improvement in the application user interface 154. The analytics engine 124 uses the use case descriptions 142 and the usability metrics 136 to identify such areas for improvement. As one example, if the developer expects the user to take a particular path through the pages of the application user interface 154 in order to complete a task, yet observed interactions show that most users take a different path, the developer may consider restructuring the navigation through the application user interface 154.

After receiving from the developer an application 133 and an indication that application 133 is to be modified with metric generation code 139, the developer portal 118 instruments the application 133 with the metric generation code 139, for example, using an instrumentation engine. Once instrumented, a modified application 133 reports the usability metrics 136 back to the metric collection service 121 that is executed in the computing device 103.

The developer portal 118 stores the instrumented application 133 in the data store 127 and makes the application 133 available to users in an application marketplace 130. Users may access the application marketplace 130 and place an order for the application 133 through the electronic commerce service 115. Upon consummating the order, the electronic commerce service 115 facilitates a transfer of the modified application 133 to the client device 106. In various embodiments, the application 133 may be transferred in digital form over the network 112. In other embodiments, the application 133 may be physically delivered to the user in the form of a computer-readable medium.

A user installs the modified application 133 on one or more devices 106, which may or may not be the same client device 106 through which the application 133 was obtained. Other users may also obtain and install the same application 133 through the application marketplace 130. In this manner, various users execute instances of the application 133 in the devices 106. Various versions of the same application 133 may be available through the application marketplace 130. Application developers can then apply use cases to determine the usability of one version as compared to another version. User may not be aware of the differences between versions, or even that different versions exist.

As described above, the instances of the modified application 133 are configured to generate and report various usability metrics 136 to the metric collection service 121 through the metric generation code 139. The usability metrics 136 may be reported to the metric collection service 121 in an encrypted format or by way of an encrypted channel over the network 112. The metric collection service 121 may be configured to track and store the usability metrics 136 at the user level, session level, or device level. The metric collection service 121 may be configured to aggregate the usability metrics 136 at any of these levels.

The analytics engine 124 analyzes the collected usability metrics 136 in conjunction with use case descriptions 142 provided by the developer via the developer portal 118. This analysis may be performed periodically, after a predefined number of usability metrics 136 are collected, upon request by a developer, or may be triggered by some other action. During the analysis, the analytics engine 124 identifies one or more differences or discrepancies between a developer-contemplated use case description 142 and actual user behavior as captured by usability metrics 136. The analytics engine 124 then identifies which aspect or aspects of the application user interface is responsible for these differences, and provides the identified user interface aspect(s) to the developer as a possible improvement to the application 133. The analysis process will be described in further detail below.

The user interface aspects identified by the analytics engine 124 may include aspects related to pages of the interface and aspects related to the flow of the interface between these pages. Within a particular page, the analytics engine 124 may identify particular components which can be improved, for example, improvements to the visual design of the component or the page, or improvements to the placement of the components on the page. As a user interacts with the user interface, the user progresses or flows from one page to another by interacting with particular user interface elements. Some of these may be actionable elements while others may be inactionable elements.

Figure 2:
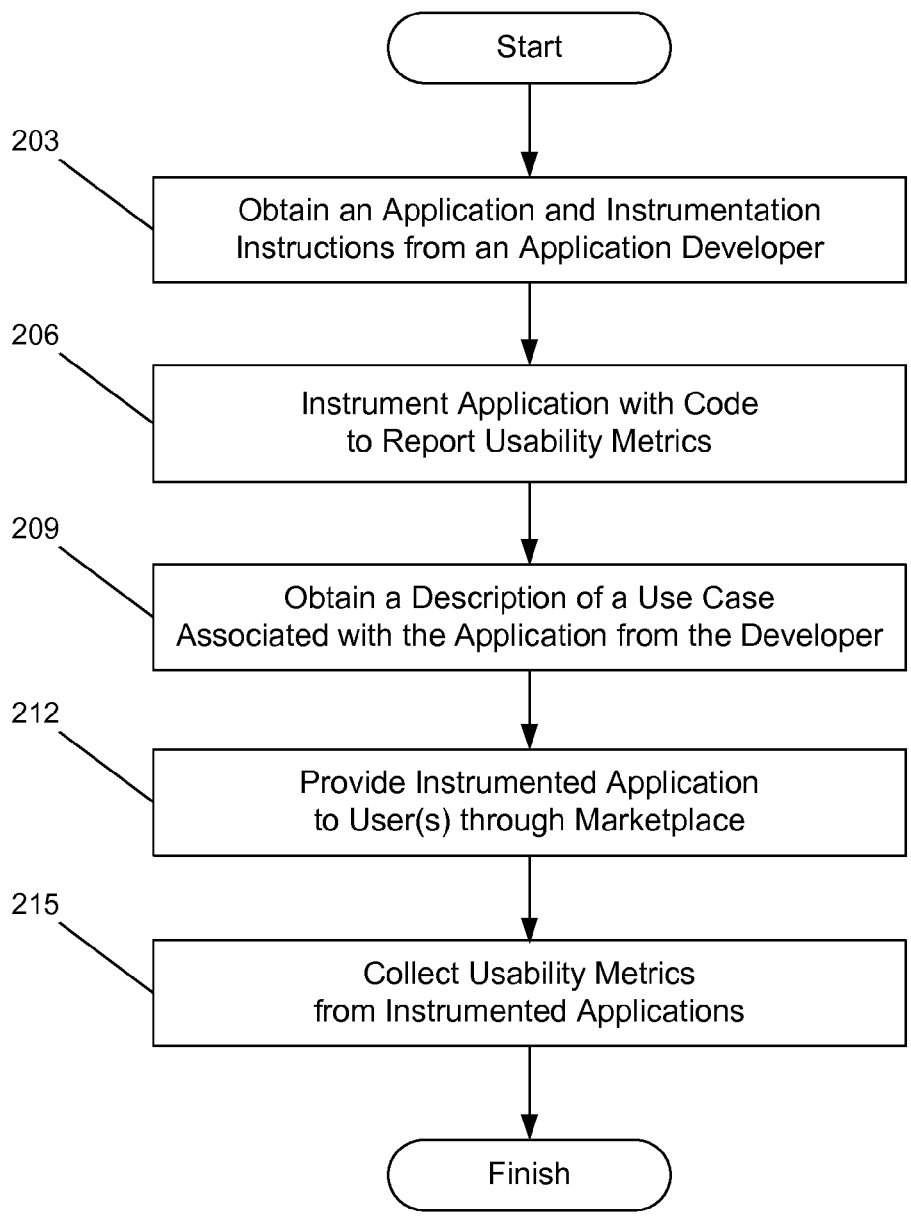
FIG. 2 is a flowchart illustrating an example of functionality implemented as portions of a developer portal and/or a metric collection service executed in a computing device in the networked environment of FIG. 1 according to various embodiments of the present disclosure.

Turning now to FIG. 2, shown is a flowchart that provides one example of the operation of portion(s) of the developer portal 118 and the metric collection service 121 according to various embodiments. It is understood that the flowchart of FIG. 2 provides merely an example of the many different types of functional arrangements that may be employed to implement the operation of portion(s) of the analytics engine 124 as described herein. As an alternative, the flowchart of FIG. 3 may be viewed as depicting an example of steps of a method implemented in the computing device 103 (FIG. 1) according to one or more embodiments.

Beginning at box 203, the developer portal 118 obtains, from a developer and through the network 112, an application 133 to be offered through the application marketplace 130.

The developer portal 118 also obtains instructions regarding instrumentation of the application 133 with code for generating and reporting usability metrics 136. As noted above, the instrumentation instructions may indicate particular locations within the application 133 for instrumenting, as well as specifying what data is to be included in a particular usability metric 136.

Next, at box 206, the developer portal 118 instruments the application 133 with code to generate and report usability metrics 136. The reporting may happen as the application 133 generates each usability metric 136, after a batch of usability metrics 136 is generated, periodically, relative to an event, or at another time. In one embodiment, the application 133 may delay reporting based on the user client device system load, network load, and/or network status.

To instrument the application 133, the developer portal 118 may profile the code which makes up the application 133. The profiling may involve parsing the application 133 to search for stored signatures, bytecode profiles, source code profiles, predefined file offsets, etc. The developer portal 118 may automatically insert or inject code into the application 133 that corresponds to portions of the metric generation code 139 for the purpose of generating and reporting usability metrics 136. In some embodiments, the developer may flag certain code in the application 133 or make certain library and/or function calls in order to indicate where the metric generation code 139 is to be inserted. That is, the instrumentation instructions from the developer may be provided as part of the application 133 itself.

In some embodiments, developer portal 118 may modify the application 133 such that the metric generation code 139 generates a specific usability metric 136 (referred to herein as a navigation path metric) any time a different page of the user interface 154 is depicted on the client device 106. For example, suppose the user interface 154 includes a start page, a search results page, a browse page, an item detail page, and a transaction page. In that case, an application session in which the user finds a product through search would report the start page, the search results page, and the item detail page. Similarly, an application session in which the user buys a product after browsing the electronic catalog would report the home page, one or more browse pages, the product detail page, and one or more transaction pages.

In some embodiments, developer portal 118 may modify the application 133 such that the metric generation code 139 generates a navigation path metric any time an actionable element of the application user interface 154 appears on a page of the user interface 154. For example, suppose the start page of the user interface 154 includes a search box, a search button, a browse tree, a list of top selling items, and a list of recently viewed items. In that case, when the start page is depicted on the client device 106, the metric generation code 139 generates a navigation path metric for the search box, search button, each of the nodes in the browse tree, each of the items in the top seller list, and each of the items in the recently viewed list.

In some embodiments, developer portal 118 may modify the application 133 such that the metric generation code 139 generates a navigation path metric any time the user selects or otherwise engages an actionable element of the application user interface 154. To continue with the earlier example of an application session, if user types a phrase into search box and then clicks the search button, the metric generation code 139 generates a navigation path metric indicating interaction with the search box and a navigation path metric indicating interaction with the search button.

In some embodiments, instead of reporting navigation path metrics to the metric collection service 121, the metric generation code 139 may instead use the navigation path data to derive other metrics such as task completion time, task error rate, task completion rate, or other suitable metrics. Moreover, the choice of communicating navigation path metrics to the computing device 103 or processing them locally at the client device 106 may be made at run-time, depending on the relative capabilities of the server and the client and/or the characteristics of the network 112.

Next, at box 209, the developer portal 118 obtains from the developer a use case description 142 for the application 133. The use case description 142 includes a description of a task which the user completes by interacting with the user interface 154 of the application 133. One example of a task might be purchasing a product from an electronic catalog. Another example of a task might be using a product from an electronic catalog for a trial period. The use case description 142 also includes a goal for the task. The goal may have a single term, for example, task completion in ninety seconds. Alternatively, the goal may be compound, for example, task completion in ninety seconds by 80% of the users who started the task. The use case description 142 may also include a specific path to complete the task.

The use case description 142 may specify one or more usability metrics 136 used to determine whether or not the goal is met. A non-limiting list of usability metrics 136 to evaluate a goal includes a task completion time, a task success rate, a conversion rate, and a task error rate. A goal may include more than one usability metric 136, for example, 80% of users complete the task in three minutes and with no more than one task error.

At box 212, the electronic commerce service 115 inserts the instrumented application 133 into one or more application marketplaces 130, where users can purchase, lease, or otherwise consume the application 133. As discussed above, after obtaining the application 133 through the application marketplace 130, a user installs and executes the application 133 on a client device 106. In some embodiments, the instrumented application 133 is selectively offered to users in the application marketplaces 130, and the developer is given some control of the selection. For example, the developer may be able to specify, through the developer portal 118, one or more classes of users and/or classes of client devices.

Next, at box 215, the metric collection service 121 collects usability metrics 136 from the instrumented instances of a particular application 133. The collection may be driven by the metric collection service 121 or by the metric generation code 139 in the application 133. That is, the metric collection service 121 may request the usability metrics 136 from the application 133, or the application 133 may instead push the usability metrics 136 to the metric collection service 121. If the metric collection service 121 drives the collection, the usability metrics 136 may perform the collection periodically, or upon request from the analytics engine 124. Although FIG. 2 depicts the process as being complete after box 215, it should be appreciated that the collection functionality of box 215 is ongoing.

The metric collection service 121 may also aggregate usability metrics 136. For example, if one of the usability metrics 136 indicates that a user completed a particular task within the application 133, the metric collection service 121 may keep a count of the total number of users that complete the task. The metric collection service 121 may also perform statistical calculations on usability metrics 136. For example, the metric collection service 121 may use a task time metric from individual users or sessions to derive an average time to complete a task. The metric collection service 121 may also use one metric to derive another. For example, the metric collection service 121 may use the number of users that complete a task along with the number of users that attempt the task to compute a task success rate. As another example, the metric collection service 121 may compute a conversion rate from the number of users who viewed a particular item in a list and the number of users who reached the detail page for that particular item.

Figure 3:
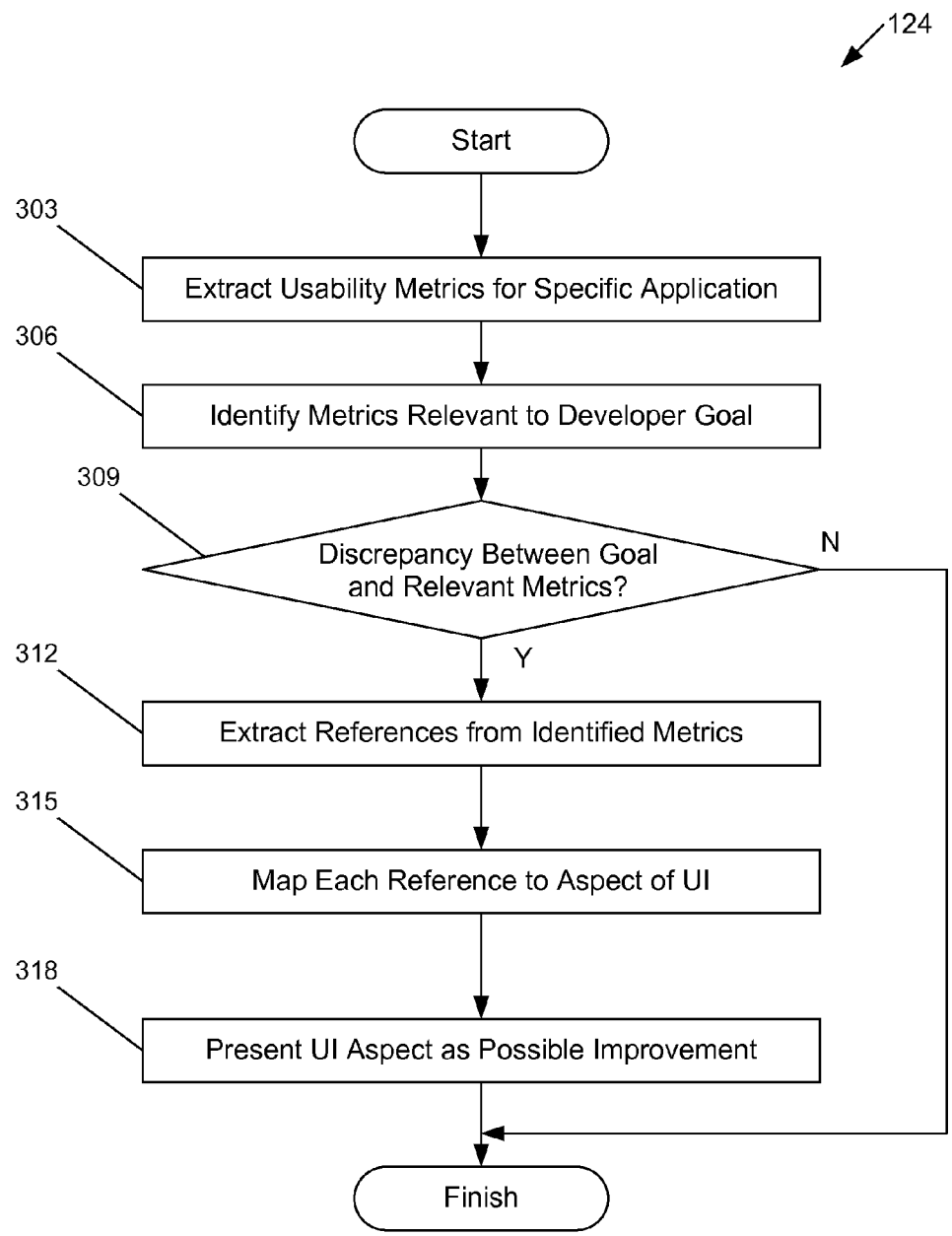
FIG. 3 is a flowchart illustrating an example of functionality implemented as portions of an analytics engine executed in a computing device in the networked environment of FIG. 1 according to various embodiments of the present disclosure.

Moving on to FIG. 3, shown is a flowchart that provides one example of the operation of portion(s) of the analytics engine 124 according to various embodiments. It is understood that the flowchart of FIG. 3 provides merely an example of the many different types of functional arrangements that may be employed to implement the operation of portion(s) of the analytics engine 124 as described herein. As an alternative, the flowchart of FIG. 3 may be viewed as depicting an example of steps of a method implemented in the computing device 103 (FIG. 1) according to one or more embodiments.

The process of FIG. 3 performs analysis on usability metrics 136 for a particular application and for a particular use case. The particular application and use case may be identified in analysis request presented to the analytics engine 124 by, for example, the developer portal 118. Beginning at box 303, the analytics engine 124 examines the collected usability metrics 136 and identifies those metrics which have been reported by the particular application 133, for example, from an application identifier stored in, or in association with, the usability metric 136. The functionality of box 303 may be appropriate in embodiments where the metric collection service 121 handles collection for multiple applications 133.

Next, at box 306 the analytics engine 124 obtains the goal for the identified use case from the use case description 142. The analytics engine 124 identifies which of the application's usability metrics 136 are relevant for the goal. In some embodiments, the goals in a use case description 142 are limited to a set of predefined types, and the analytics engine 124 performs a mapping from goal type to a set of relevant usability metrics 136. In some embodiments, the use case description 142 may itself specify one or more usability metrics 136 used to evaluate the completion of the goal.

At box 309 the analytics engine 124 evaluates the goal in light of the identified usability metrics 136. If the metrics indicate that the developer's goal has been achieved, then no further processing is necessary for the requested use case, and the processing of FIG. 3 is complete. On the other hand, if the evaluation at box 309 indicates a discrepancy between the use case goal and user behavior as captured in the identified usability metrics 136, then processing continues at box 312. In determining a discrepancy between a goal and a particular usability metric 136, the analytics engine 124 may perform aggregation or a statistical calculation with respect to the usability metric 136. For example, if the collected usability metrics 136 included 100 instances of a task completion time, the analytics engine 124 may compute the average of the task completion time, and compare the average to the goal.

Next, at box 312, the analytics engine 124 extracts references or tags from the identified usability metrics 136. Each tag or reference is associated with a particular aspect or element of the user interface 154. This association between user interface element and metric was embedded in the application 133 in some manner, so that the metric generation code 139 includes the tag along with the metric that is reported to the metric collection service 170. For example, the developer may embed within the application 133 function calls to an application programming interface provided by the developer portal 118, where each of these function calls link a user interface element to a reported metric. When the application 133 executes in the client device 106, these API calls inform the developer portal 118 of the mapping between user interface element and metrics. The developer portal 118 then stores these mappings in the data store 127.

At box 315, the analytics engine 124 maps the tag to a user interface element, using the stored mapping mentioned above. Finally, at box 318, the analytics engine 124 designates the user interface element as an aspect of the user interface 154 for possible improvement and provides the developer with information about the aspect designated for improvement. For example, the analytics engine 124 may provide the developer with a uniform resource locator (URL), or an image, or a text description for a page or user interface element to be improved. The analytics engine 124 may also provide the developer with an identifier for the use case description 142 and/or the application 133. The analytics engine 124 may further provide the developer with information about the users for which usability metrics 136 were collected. The improvement information communicated to the developer may take various forms, such as a list, a table, a report, or a chart. The information may be communicated to the developer through the developer portal 118 upon log on to the developer's account. After providing the developer with information about possible improvements, the process of FIG. 3 is then complete.

Several non-limiting examples of identified improvements will now be discussed. As one example of an identified improvement, the analytics engine 124 may determine, from a low conversion score in the usability metrics 136, that users are failing to reach the item detail page for items shown on the very top or the very bottom of a top sellers page in the user interface 154. Under such conditions, the analytics engine 124 might identify the layout of the top sellers page as an aspect of the user interface 154 to be improved.

As another example of an identified improvement, the analytics engine 124 may determine, from the usability metrics 136, that 40% of users complete a task associated with the developer's goal by taking a primary navigation path through the user interface 154 and 60% of users complete the task by taking a secondary navigation path. Under such conditions, the analytics engine 124 might identify the secondary navigation path as an aspect of the user interface 154 to be improved. The analytics engine 124 might further indicate to the developer that improving this aspect would improve the efficiency of the application 133.

As yet another example of an identified improvement, the analytics engine 124 may determine that the usability metrics 136 show 40% of users completing a task associated with the developer's goal by taking a primary navigation path through the user interface 154 and 60% of users completing the task by taking a secondary navigation path. The analytics engine 124 might then identify the secondary navigation path as an aspect of the user interface 154 to be improved. The analytics engine 124 might further indicate to the developer that improving this aspect would improve the efficiency of the application 133.

In some embodiments, the analytics engine 124 offers specific recommendations to improve the user interface 154 in addition to identifying aspects of the user interface 154 for improvement. For example, the analytics engine 124 may recommend an alternate layout for a page of the user interface 154, or an alternate navigation path to complete a task or goal. In other embodiments, the specific suggestions for improvement are provided instead of a more general recommendation of aspects to be improved.

In some embodiments, the analytics engine 124 may identify multiple aspects for improvement, and may rank or prioritize the aspects. In determining a discrepancy between the goal and the user behavior captured by the usability metrics 136, the analytics engine 124 may generate a score for the desired behavior expressed in the use case description 142 and another score for the observed user behavior. The analytics engine 124 may then use differences between these scores as criteria for ranking or prioritizing among multiple improvements.

In some embodiments, the analytics engine 124 may compare user behavior, as captured through usability metrics 136, against a goal associated with a class of applications rather than a particular developer goal. For example, the analytics engine 124 may compare performance of a developer's application to a performance of a representative group of electronic commerce applications. The analytics engine 124 may then communicate to the developer how well the developer's application performed relative to the representative group (e.g., the top 25% percentile).

After receiving information about possible improvements to the user interface 154 of the application 133, the developer may provide another version of the application 133 to be made available to users through the application marketplace 130. In some embodiments, multiple versions of the application 133 are stored by the computing device 103, and analytics engine 124 is notified of new versions and/or updates to applications 133. The analytics engine 124 may then determine which version is most appropriate for a particular user, and may communicate this information to the electronic commerce service 115 so that the application marketplace 130 can offer the appropriate version. The determination by the analytics engine 124 as to which version is most appropriate may be made, for example, by using behavior metrics to classify users into profiles. Such techniques are described in the commonly-assigned patent application entitled "Behavioral Characterization" (Ser. No. 13/276,370, filed Oct. 19, 2011), which is hereby incorporated herein in its entirety. In some embodiments, the determination made by the analytics engine 124 considers which version is optimized for the user's behavior pattern. For example, two versions of the application 133 may differ in the layout used on a particular page of the user interface 154, where one layout is optimized for a small screen such as that used by a mobile device and another layout is optimized for a larger screen such as that used by a desktop computer.

Figure 4A:
FIGS. 4A and 4B are drawings of example user interface screens rendered by an application executing on a client device in the networked environment of FIG. 1 according to various embodiments of the present disclosure.
Figure 4B:

Described above are various types of improvements which may be recommended by the analytics engine 124. One specific example of such an improvement will now be discussed: the placement of an actionable button on the page. With reference now to FIGS. 4A and 4B, shown are drawings of example user interface screens 400a and 400b, which differ in the placement of a "Buy Now" button. The screen 400a illustrated in FIG. 4A includes two portions, a visible portion 403 and a hidden portion 406, where the hidden portion 406 becomes visible when the user scrolls down to the bottom of the screen. Screen 400a represents a first user interface in which the "Buy Now" button 409 is placed at the bottom of the screen, in the hidden portion 406. In one scenario, the analytics engine 124 determines, from the collected usability metrics 136, that users took longer than expected to discover and act on the "Buy Now" button 409. The analytics engine 124 may then recommend as an improvement moving the button 409 to the top of the screen so that the button is rendered in the visible portion 403 of the screen and is thus immediately visible to the user viewing the page. This improvement can be seen on screen 400b in FIG. 4B, where the "Buy Now" button 409 appears at the top of the screen 400b.

In these examples, the screens correspond to network pages rendered by a browser application 145 (FIG. 1) executing on a client device 106 (FIG. 1) in the networked environment 100 (FIG. 1) according to various embodiments of the present disclosure. However, in other embodiments a user interface is rendered directly by a client application, outside of a browser context.

Figure 5:
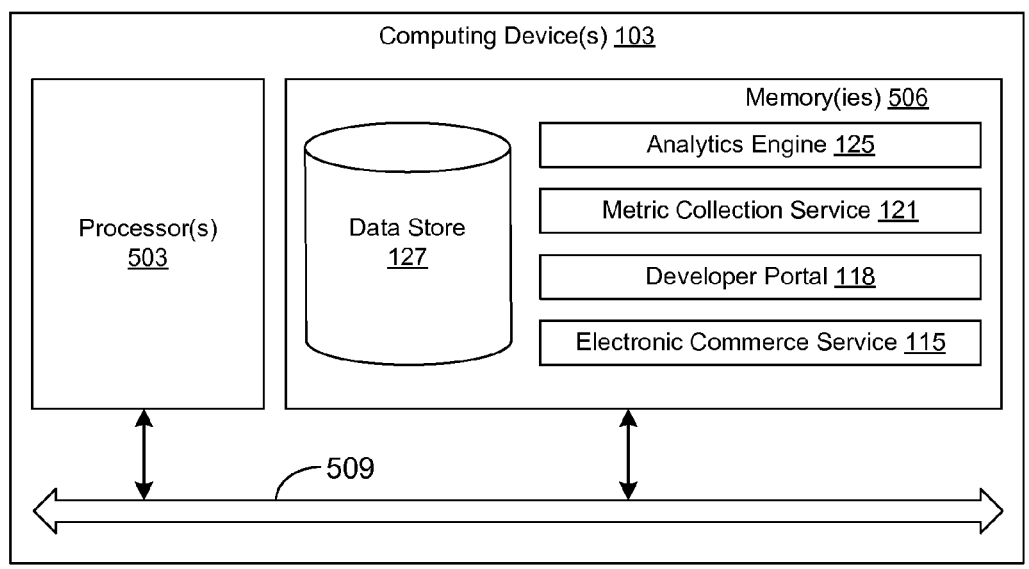
FIG. 5 is a schematic block diagram that provides one example illustration of a computing device employed in the networked environment of FIG. 1 according to various embodiments of the present disclosure.

With reference now to FIG. 5, shown is a schematic block diagram of the according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the analytics engine 124, the electronic commerce application 127, and potentially other applications. Also stored in the memory 506 may be a data store 127 and other data. In addition, an operating system may be stored in the processor 503 and executable by the processor 503. While not illustrated, the client device 106 and the client device 109 (FIG. 1) also include components like those shown in FIG. 5, whereby the browser 151 (FIG. 1) and/or the application 133 are stored in a memory and executable by a processor.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and executed by the processor 503, source code that may be expressed in proper format such as object code that is capable of being loaded into a random access portion of the memory 506 and executed by the processor 503, or source code that may be interpreted by another executable program to generate instructions in a random access portion of the memory 506 and executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 112 (FIG. 1) that facilitates communication between any two of the multiple processors 503, between any of the processors 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce service 115, the developer portal 118, the metric collection service 121, the analytics engine 124 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the analytics engine 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 503 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in the flowchart of FIG. 3 may be executed concurrently or with partial concurrence. Further, in some embodiments, one or more of the blocks shown in the flowchart of FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the electronic commerce service 115, the developer portal 118, the metric collection service 121, and the analytics engine 124) that comprises software or code can be embodied in any non-transitory computer-readable medium for use by or in connection with an instruction execution system such as, for example, the processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
    code that obtains a use case description from a developer of an application, the use case description comprising a goal and a task associated with the goal;
    code that collects a plurality of usability metrics based at least in part upon an interaction of each of a plurality of users with a user interface of the application;
    code that identifies which of the plurality of usability metrics are metrics associated with the goal;
    code that determines a discrepancy between the metrics associated with the goal and the task associated with the goal based at least in part upon an average of the metrics associated with the goal for the plurality of users;
    code that identifies at least one actionable element associated with the task;
    code that designates the at least one actionable element as an aspect of the user interface for improvement based at least in part upon the discrepancy between the metrics associated with the goal and the goal;

code that provides information about the aspect of the user interface for improvement to the developer;

code that determines, for one of the plurality of users, a usage pattern of the application;

code that classifies one of the plurality of users into a user classification based at least in part upon the usage pattern;

code that selects one of the application and another version of the application as a best fit application for the user based at least in part on the user classification; and code that provides the best fit application to the one of the plurality of users.

2. The non-transitory computer-readable medium of claim 1, wherein the code that selects comprises code that determines which of the application and the another version of the application is better optimized, with respect to the goal, for the usage pattern.

3. The non-transitory computer-readable medium of claim 1, the program further comprising code that, after the information about the aspect of the user interface for improvement is provided to the developer, obtains the another version of the application from the developer.

4. A method, comprising:
obtaining, by a computer, a use case description from a developer of an application;
collecting, by the computer, a plurality of usability metrics based at least in part upon an interaction of each of a plurality of users with a user interface of the application, the use case description comprising a task associated with a goal;
determining a discrepancy between the plurality of usability metrics and the task associated with the goal based at least in part upon an average of the usability metrics for the plurality of users;
analyzing, by the computer, the discrepancy in conjunction with the use case description to identify at least one aspect of the user interface for improvement, the at least one aspect of the user interface for improvement comprising at least one of a page aspect and an interface flow aspect; and
providing, by the computer, information about the at least one aspect of the user interface for improvement to the developer.

5. The method of claim 4, wherein the interface flow aspect comprises at least one of an actionable element and an inactionable element.

6. The method of claim 4, wherein the page aspect further comprises a visual design of a page component and a placement of the page component.

7. The method of claim 4, further comprising:
identifying which of the plurality of usability metrics are metrics associated with the goal;
identifying at least one actionable element associated with the task associated with the goal; and
selecting the at least one actionable element as the at least one aspect of the user interface for improvement.

8. The method of claim 7, wherein the goal is measured relative to a group of applications in a same category as the application.

9. The method of claim 4, further comprising:
aggregating the plurality of usability metrics into a plurality of groups of usabilty metrics; and
determining the discrepancy as a difference between an average of at least one of the groups of usabilty metrics and the task associated with the goal.

10. The method of claim 4, wherein the plurality of usability metrics include at least one of a conversion rate, a recognition metric, a recall metric, a task performance metric, an engagement metric, and a physiological metric.

11. The method of claim 10, wherein the task performance metric is associated with a task and includes at least one of a completion time, a success rate, an error rate, an error recovery rate, and a navigation path.

12. The method of claim 4, wherein the at least one aspect of the user interface for improvement comprises a plurality of improvements, the method further comprising recommending a selected one of the plurality of improvements to the developer.

13. The method of claim 4, further comprising:
obtaining the application from the developer; and
providing the application to the plurality of users.

14. The method of claim 13, further comprising:
determining, for one of the plurality of users, a usage pattern of the application;
classifying the one of the plurality of users into a user classification based at least in part upon the usage pattern;
selecting one of the application and another version of the application as a best fit application for the one of the plurality of users based at least in part on the user classification; and
providing, to the one of the plurality of users, the best fit application.

15. The method of claim 14, wherein the use case description further comprises a goal and the selecting comprises determining which of the application and the another version of the application is better optimized, with respect to the goal, for the usage pattern.

16. The method of claim 14, further comprising, after the at least one aspect of the user interface for improvement is provided to the developer, obtaining the another version of the application from the developer.

17. A system, comprising:
at least one computing device; and
an application implemented in the at least one computing device, the application comprising:
logic that obtains a use case description from a developer of an application;
logic that collects a plurality of usability metrics based at least in part upon an interaction of each of a plurality of users with a user interface of the application;
logic that processes the plurality of usability metrics in conjunction with the use case description to determine a discrepancy between an average of at least a portion of the plurality of usability metrics and a goal included in the use case description;
logic that, upon determining the discrepancy, identifies at least one aspect of the user interface that is associated with the goal, the at least one aspect of the user interface comprising at least one of a page and an actionable element;
logic that designates the at least one aspect of the user interface as an aspect for improvement; and
logic that provides information about the at least one aspect of the user interface for improvement to the developer.

18. The system of claim 17, wherein the use case description further comprises a task associated with the goal, and wherein the logic that processes further comprises:
logic that identifies which of the plurality of usability metrics are metrics associated with the goal;

logic that identifies at least one actionable element associated with the task associated with the goal; and logic that selects the at least one actionable element as the at least one aspect of the user interface for improvement.

19. The system of claim 17, wherein the plurality of usability metrics include at least one of a task performance metric, an engagement metric, and a physiological metric.

20. The system of claim 19, wherein the task performance metric is associated with a task and includes at least one of a completion time, a success rate, an error rate, an error recovery rate, and a navigation path.

21. The system of claim 17, wherein the at least one aspect of the user interface for improvement comprises a plurality of improvements, the application further comprising logic that recommends a selected one of the plurality of improvements to the developer.

22. The system of claim 17, wherein the at least one aspect of the user interface for improvement comprises a plurality of improvements, the application further comprising:

logic that scores each of the plurality of improvements to produce a plurality of improvement scores;

logic that prioritizes the plurality of improvements into a prioritization of improvements based at least upon the plurality of improvement scores; and logic that provides the prioritization of improvements to the developer.

* * * * *